US008082507B2

(12) United States Patent
Speicher et al.

(10) Patent No.: US 8,082,507 B2
(45) Date of Patent: Dec. 20, 2011

(54) SCALABLE USER INTERFACE

(75) Inventors: Ashley C Speicher, Redmond, WA (US); Todd Bowra, Redmond, WA (US); Nicholas J Fang, Redmond, WA (US); Sudhakar V Prabhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 11/761,508

(22) Filed: Jun. 12, 2007

(65) Prior Publication Data

US 2008/0313555 A1 Dec. 18, 2008

(51) Int. Cl.
*G06F 3/00* (2006.01)
(52) U.S. Cl. ........................ 715/740; 715/744
(58) Field of Classification Search .................. 715/740, 715/744
See application file for complete search history.

(56) References Cited

U.S. PATENT DOCUMENTS

| | | | | |
|---|---|---|---|---|
| 5,764,235 A * | 6/1998 | Hunt et al. | | 345/428 |
| 6,014,694 A | 1/2000 | Aharoni et al. | | |
| 6,188,670 B1 | 2/2001 | Lackman et al. | | |
| 6,311,215 B1 * | 10/2001 | Bakshi et al. | | 709/221 |
| 6,563,517 B1 * | 5/2003 | Bhagwat et al. | | 715/735 |
| 6,606,413 B1 | 8/2003 | Zeineh | | |
| 6,725,303 B1 * | 4/2004 | Hoguta et al. | | 710/106 |
| 7,093,028 B1 | 8/2006 | Shao et al. | | |
| 7,116,682 B1 * | 10/2006 | Waclawsky et al. | | 370/468 |
| 7,222,306 B2 * | 5/2007 | Kaasila et al. | | 715/801 |
| 7,558,198 B2 * | 7/2009 | Kane | | 370/230 |
| 7,574,653 B2 * | 8/2009 | Croney et al. | | 715/249 |
| 7,664,856 B2 * | 2/2010 | Bowra et al. | | 709/225 |
| 7,783,775 B2 * | 8/2010 | Kim et al. | | 709/231 |
| 7,934,162 B2 * | 4/2011 | Wong et al. | | 715/747 |
| 2001/0001137 A1 | 5/2001 | Alexander | | |
| 2001/0020905 A1 * | 9/2001 | Gatepin et al. | | 341/50 |
| 2003/0063120 A1 | 4/2003 | Wong et al. | | |
| 2003/0126293 A1 * | 7/2003 | Bushey | | 709/246 |
| 2004/0004630 A1 * | 1/2004 | Kalva et al. | | 345/702 |
| 2004/0177323 A1 | 9/2004 | Kaasila et al. | | |
| 2004/0207723 A1 | 10/2004 | Davis et al. | | |
| 2004/0218680 A1 * | 11/2004 | Rodriguez et al. | | 375/240.25 |
| 2005/0120128 A1 * | 6/2005 | Willes et al. | | 709/232 |
| 2005/0160261 A1 | 7/2005 | Barry et al. | | |
| 2006/0258459 A1 | 11/2006 | Davis et al. | | |
| 2007/0011343 A1 | 1/2007 | Davis et al. | | |
| 2007/0027983 A1 * | 2/2007 | Bowra et al. | | 709/224 |

(Continued)

OTHER PUBLICATIONS

Chris Loeser, Michael Ditze, Peter Altenbernd, Franz Rammig, GRUSEL—A self optimizing, bandwidth aware Video on Demand P2P,Proceedings of the International Conference on Autonomic Computing (ICAC'04), p. 1-2.*

(Continued)

*Primary Examiner* — Ashraf Zahr
(74) *Attorney, Agent, or Firm* — Alleman Hall McCoy Russell & Tuttle LLP

(57) ABSTRACT

The scaling of a user interface according to network or device limitations is disclosed. One embodiment provides a method of scaling a user interface, comprising sending a user interface over a network to a networked device, detecting a performance limitation of the user interface in at least one of the network or the networked device, and scaling a parameter of the user interface in response to the detected limitation to improve the performance of the user interface. In this manner, a user interface may be scaled in response to limitations on performance and end-user experience can be improved.

17 Claims, 5 Drawing Sheets

U.S. PATENT DOCUMENTS

| | | | | |
|---|---|---|---|---|
| 2008/0020775 | A1* | 1/2008 | Willars | 455/445 |
| 2008/0147864 | A1* | 6/2008 | Drogo De Iacovo et al. | 709/226 |
| 2008/0195744 | A1* | 8/2008 | Bowra et al. | 709/231 |
| 2009/0006977 | A1* | 1/2009 | Shim | 715/740 |

OTHER PUBLICATIONS

Huang, et al., "Adaptive Live Video Streaming by Priority Drop", Proceedings IEEE Conference on Advanced Video and Signal Based Surveillance, Jul. 21-22, 2003, pp. 1-10.

Denemark, et al., "Real-time Transcoding and Scalable Data Distribution for Video Streaming", CESNET, Dec. 18, 2006, pp. 1-6.

"Interoperable Home Infrastructure", Intel Technology Journal, vol. 6, Issue 4, Nov. 15, 2002, Intel Corporation, pp. 1-78.

ISA Korea, International Search Report of PCT/US2008/065655, Sep. 9, 2008, 3 pages.

* cited by examiner the claimed subject matter. Furthermore, the claimed subject matter is not limited to implementations that solve any or all disadvantages noted in any part of this disclosure.
SCALABLE USER INTERFACE

BACKGROUND

As computing and communication networks continue to evolve, media is increasingly being stored, shared, and played over these networks. Media management software allows an end user to browse, play, record, access, etc., media files stored on a network, typically through a user interface (UI). The UI can be sent from a media server through a network to an end user over a different channel than the media files that the user is accessing. For example, the media files may be Audio/Video (A/V) content sent using Real-time Transport Protocol (RTP) or Hypertext Transfer Protocol (HTTP), while the UI may be sent using another protocol, such as Extender Session Protocol (XSP).

As these networks evolve, media management software is trending toward a high-fidelity UI experience that may be streamed from a media server to a media receiver. Unfortunately, the technology used to deliver the UI generally relies upon sufficient bandwidth being present to deliver an uninterrupted experience, unlike the A/V streaming components, which have large investments in congestion management technology. As network bandwidth is limited, the UI can be sluggish. Additionally, as network performance decreases, the UI traffic may actually impede the A/V traffic and degrade the A/V experience, even when the A/V content is the primary user experience and the UI is not currently being used.

SUMMARY

Accordingly, various embodiments of a scalable user interface are described below in the Detailed Description. For example, one disclosed embodiment provides a method of scaling a user interface, comprising sending a user interface over a network to a networked device, detecting a performance limitation of the user interface in at least one of the network or the networked device, and scaling a parameter of the user interface in response to the detected limitation to improve the performance of the user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
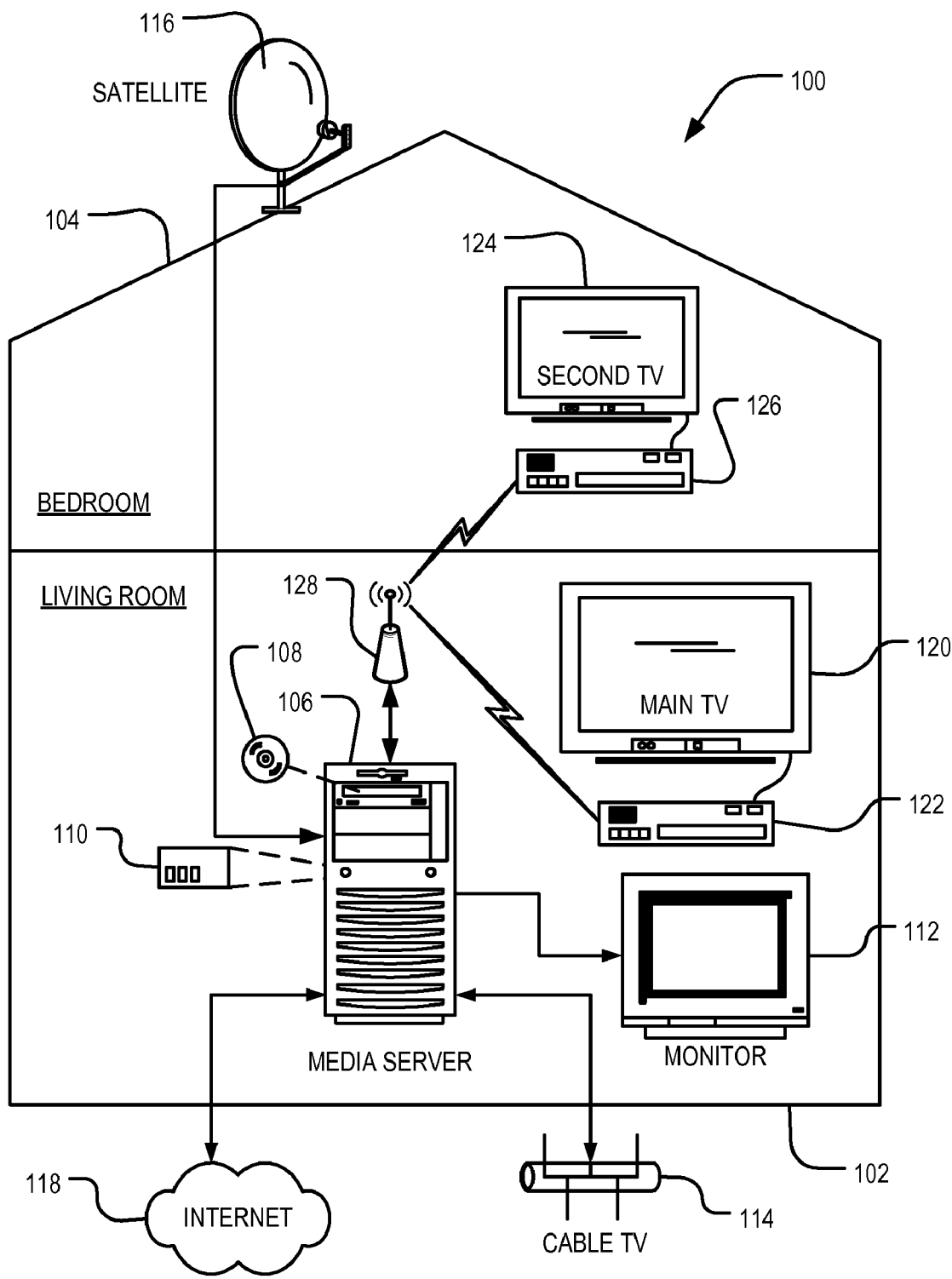
FIG. 1 shows an example of an embodiment of a home media environment.

Prior to discussing embodiments for scaling a user interface, an example streaming media use environment is described. FIG. 1 depicts an exemplary home entertainment environment 100 including a living room 102 and a bedroom 104. Central to the home entertainment environment 100 is a media server 106, in this implementation situated in the living room 102, but which could be located anywhere within the house or in communication with devices in the house through a network 128. In one implementation, the media server 106 is a conventional personal computer (PC) configured to run a multimedia software package, for example, a Windows Vista Ultimate operating system with Windows Media Center (available from Microsoft Corporation of Redmond, Wash.). In such a configuration, the media server 106 is able to integrate full computing functionality with a complete home entertainment system into a single PC. For example, a user can watch television (TV) in one graphical window of an attached video monitor 112, while sending e-mail or working on a spreadsheet in another graphical window on the same monitor 112. In addition, the media server 106 may also include other features or components, for example: a digital video recorder (DVR) to capture video content for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, data, media, and home videos; and an electronic program guide (EPG) (not shown in FIG. 1).

Instead of a conventional PC, the media server 106 may comprise a variety of other devices capable of storing and distributing media content including, for example, a notebook or portable computer, a tablet PC, a workstation, a mainframe computer, a server, an Internet appliance, a DVR, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive e-mails, browse the Internet, or perform other functions.

In addition to storing media content, the media server 106 may be connected with a variety of media sources, for example, a cable connection 114, a satellite receiver 116, an antenna (not shown), and/or a network such as the Internet 118. A user may thus control a live stream of media content (e.g., TV content) received, for example, via the cable connection 114, the satellite receiver 116, or antenna. This capability may be enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of content. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data) and a policy or policies associated with the actual TV content. If TV content is received as an analog signal, discrete content packets may be created from the analog signal.

The entertainment environment 100 may also include one or more network devices functioning as media receivers 122, 126 placed in communication with the media server 106 through a network 128, for example, a local area network (LAN). In an exemplary embodiment, each media receiver 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), a network capable device, or combinations thereof. Furthermore, the media receivers 122, 126 may include a tuner as described above.

The network 128 may comprise a wired and/or wireless network, for example, cable, Ethernet, WiFi, a wireless access point (WAP), or any other electronic, radio frequency or optical coupling means, including the Internet. The network 128 may enable communication between the media server 106, the media receivers 122 and 126, and any other connected device through packet-based communication protocols, such as Transmission Control Protocol (TCP), Internet Protocol (IP), Real-time Transport Protocol (RTP), User Datagram Protocol (UDP) and Real-time Transport Control Protocol (RTCP), or other packet based communication protocols, as examples. Communications may be transmitted directly between devices over a LAN, or they may be carried over a wide area network (WAN), for example, the Internet 118.

Entertainment environment 100 may include one or more video display devices, for example a main TV 120 in the living room 102, a secondary TV 124 in the bedroom 104, and a video monitor 112 in the entertainment environment 100. These video display devices may be connected with the media server 106 via the network 128 either directly or via the media receivers 122, 126. As shown in the example of FIG. 1, the main TV 120 and the secondary TV 124 may be coupled to the media receivers 122, 126 through conventional cables. The video monitor 112 may be coupled with the media server 106 directly via a video cable. The media server 106 and media receivers 122, 126 may alternatively be coupled with any of a variety of video and audio presentation devices and by other couplings than conventional cables. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via the network protocols described above, or even other network protocols. The streamed media content may comprise IPTV (television content delivered over the Internet), SD, and HD content, including video, audio, and image files, decoded on the media receivers 122, 126 for presentation on the connected TVs 120, 124 or monitor 112. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard Remote Desktop Protocol (RDP), Graphics Device Interface (GDI), Hypertext Markup Language (HTML), or other protocols providing similar functionality.

In addition to the media receivers 122, 126 and the video display devices 112, 120, 124, the media server 106 may be connected with other peripheral devices, including components such as a DVR, cable or satellite set-top boxes, speakers, a printer (not shown), etc. The media server 106 and/or media receivers 122, 126 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM).

Prior to discussing embodiments of scalable user interfaces in detail, it will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Likewise, the terms "computer" and "computing device" as used herein include any device that electronically executes one or more programs, including but not limited to media server 106, media receivers 122, 126, and any other suitable device such as personal computers, servers, laptop computers, hand-held devices, cellular phones, microprocessor-based programmable consumer electronics and/or appliances, routers, gateways, hubs and other computer networking devices.

Figure 2:
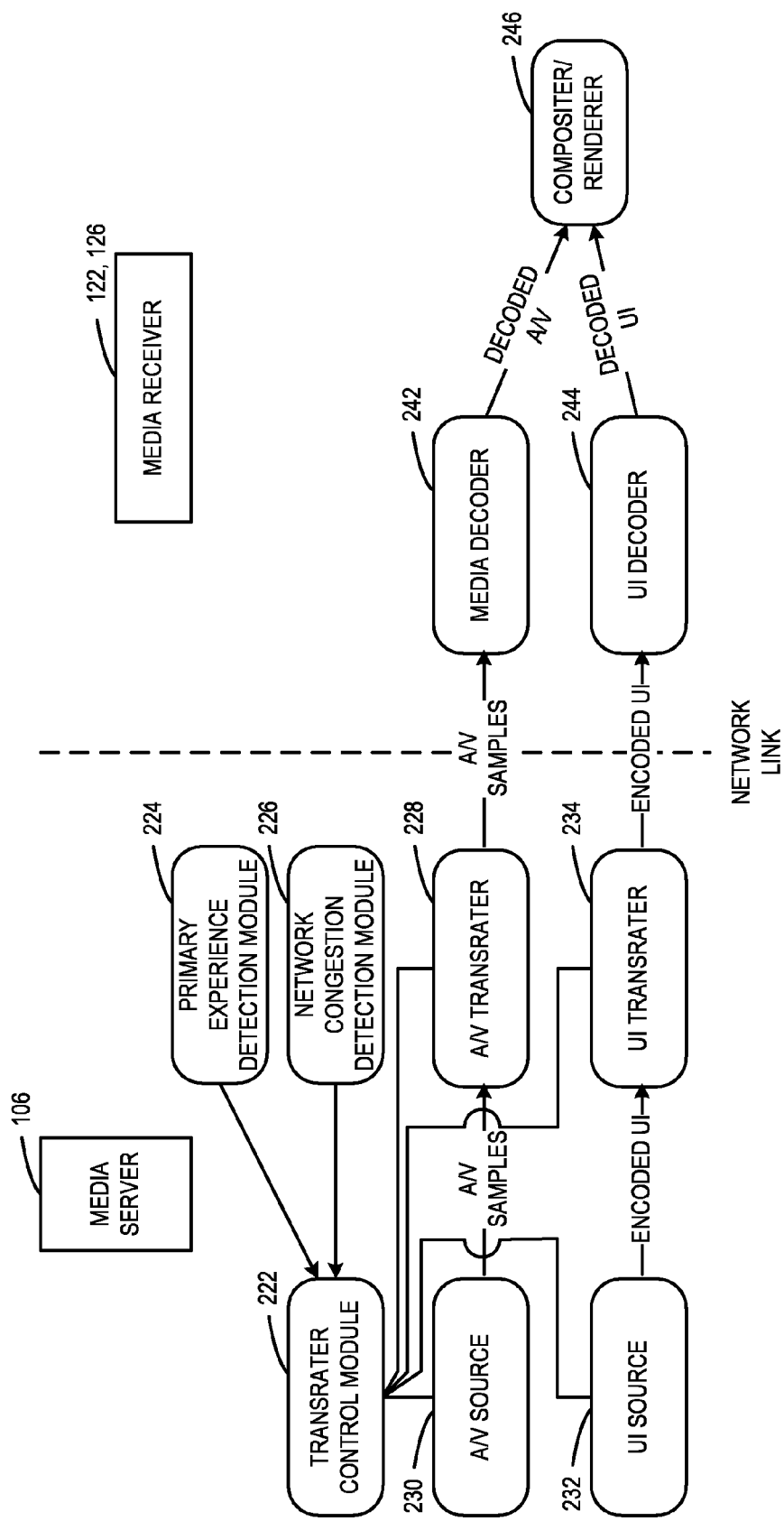
FIG. 2 shows a block diagram of a media server and a media receiver of the embodiment of FIG. 1.

FIG. 2 shows a block diagram of a media server and a media receiver of the embodiment of FIG. 1. Media server 106 supplies A/V samples and UI information through different channels over a network link to media receiver 122. An embodiment using media receiver 122 is described herein, although similar embodiments using media receiver 126, or other combinations of media receivers are also within the subject matter of this disclosure. Media receiver 122 decodes the A/V samples and the UI information and uses a compositer/renderer 246 to prepare the A/V and UI information for presentation at a display device. In response to transmission or playback performance issues, media server can adjust the A/V and UI channels to improve the experience provided by media receiver 122.

The embodiment media server 106 includes a UI source 232 that provides encoded UI information to a UI transrater 234. A transrater can scale parameters of display data, such as UI or A/V data, as the data is being sent across a network to media receiver 122. UI transrater 234 can adjust a color bit depth, transmission of an alpha channel, graphic resolution, an encoding scheme, and animations, etc. As an example, color may be adjusted from a 32-bit depth to an 8-bit depth in response to congestion on the network. This transrating involves reducing granularity of a certain parameter, thus reducing the bandwidth requirements to transmit the data and therefore improving the responsiveness of the UI or A/V experience for an end user. For example, the resolution of a graphic in the UI can be scaled down from 1280×720 to a 640×360 resolution. Other examples may include changing an encoding scheme from a lossless encoding scheme for graphics to a lossy encoding scheme, deleting animations, deleting an alpha channel, etc. Any parameter that may be adjusted to varying qualities or levels of detail may be adjusted to a lower quality in response to performance limitations of the network and playback devices, etc., in order to improve the responsiveness of the UI at media receiver 122 or 126, or at display devices 112, 120 and 124 in FIG. 1. Other embodiments may provide similar benefits to networked display devices such as PDAs, cellular phones, gaming consoles, laptop computers, pagers, MP3 players and other audio devices, or other devices that provide a user interface and can display A/V or other media content.

Referring back to the embodiment in FIG. 2, UI transrater 234 can transrate UI information and provide the encoded UI information over a network link to UI decoder 244 on media receiver 122. Likewise, A/V source 230 provides A/V samples to A/V transrater 228, which may transrate the A/V samples and send them over a network link to media decoder 242 in media receiver 122. Media decoder 242 and UI decoder 244 provide decoded UI and A/V information to compositer/renderer 246, which renders the A/V and UI for presentation to a viewer.

In some embodiments, media server 106 includes a transrater control module 222 in communication with A/V source 230, A/V transrater 228, UI source 232 and/or UI transrater 234. The transrater control module 222 can adjust the A/V and UI transraters in response to conditions in the network, media receiver, etc. For example, media server may further include a network congestion detection module 226 that is coupled to transrater control module 222. Network congestion detection module 226 may detect changes in network performance, such as bandwidth utilization and/or latency, etc., and may signal transrater control module 222 so that transrater control module 222 can respond by adjusting parameters of either the A/V or UI information.

In another embodiment, media server 106 may include a primary experience detection module 224 in communication with transrater control module 222. If compositer/renderer 246 is sending A/V and UI information to a display device, primary experience detection module 224 can detect which experience is more important to an end user, and can adjust certain parameters accordingly. For example, if a compositer/renderer is providing a music video to a networked device, and a user is also browsing a list of album covers through a user interface, the primary experience detection module 224 can determine that the user interface is more important and media server 106 can transrate the A/V samples and improve performance of the UI. In another example, if video information is being displayed over a full-screen and the UI information is being used to convey stream position information (i.e. the seek bar is being displayed), the primary experience detection module 224 may determine the video is of primary importance, and media server 106 can transrate the UI.

FIG. 2 illustrates one embodiment, but other embodiments may distribute the components illustrated in the figure in a different manner and still fall within the scope of the disclosure. For example, primary experience detection module 224 or network congestion detection module 226 may reside on the media receiver 122, etc. In one example, a media receiver 122 may track how fast it receives data and then report this data back to media server 106. In another example, media receiver 122 may detect it is receiving 20 Mbit/s A/V data and that this is near device or network capacity and accordingly direct UI information to be scaled down. Other distributions of these components can be contemplated by those of skill in the art. Further, while the present embodiment involves transrating of either UI or A/V information, other embodiments may scale UI or A/V information at generation time, while they are being encoded, or even a combination of both.

In some embodiments, media server 106 may receive detailed profiling data of performance limitations of the network or the media receiver 122, and can adjust multiple parameters of the user interface in response to the detailed profiling data. As an example, if performance profiling data shows available bandwidth is only half of the currently provided A/V and UI information, media server 106 may eliminate an alpha channel, drop from 32-bit to 16-bit color depth, and turn off all animations within one step according to the detailed profiling data. In some embodiments, media server 106 can dynamically adjust the UI and/or A/V information in response to further degradations or improvements in network or device performance.

Figure 3:
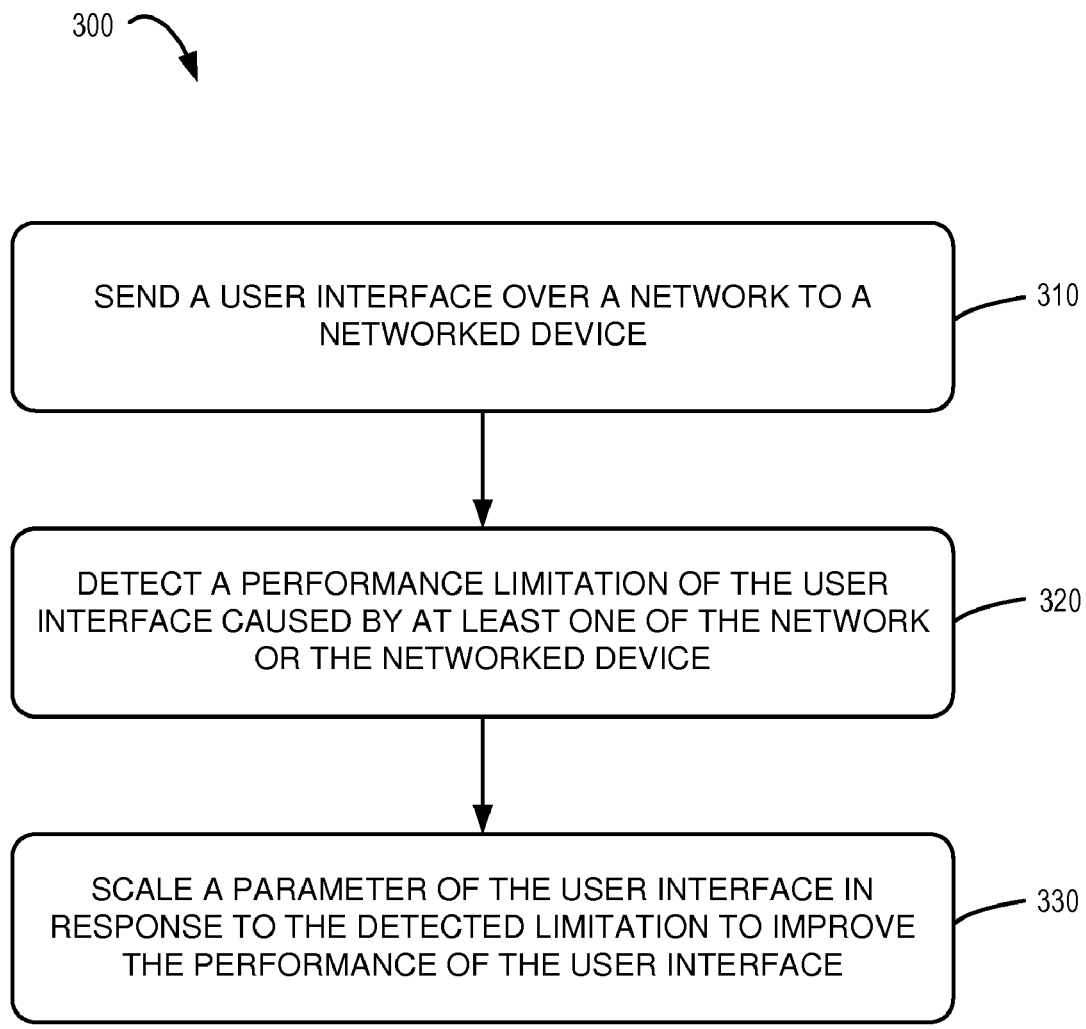
FIG. 3 shows a block diagram of an embodiment of a method for scaling a user interface.

FIG. 3 shows a block diagram of an embodiment of a method 300 for scaling a user interface. In block 310, method 300 sends a user interface over a network to a networked device. Method 300 detects a performance limitation of the user interface in at least one of the network or the networked device in block 320. In block 330, method 300 then scales a parameter of the user interface in response to the detected limitation to improve the performance of the user interface.

In some embodiments, a performance limitation or potential limitation may be detected and cached to allow scaling or setting a parameter at a later time. For example, available bandwidth may be detected with a network probe, and a parameter of the user interface can be set according to the available bandwidth. In one embodiment, performance limitations may be detected before the user interface is operational and the user interface can start up with parameters adjusted to the already detected performance limitation. In some embodiments, parameter settings from a previous session can be stored and utilized in adjusting parameters of a subsequent session. Other embodiment methods may comprise a process implementing other embodiment systems or devices in this disclosure or as covered by the appended claims. A more detailed embodiment of method 300 is illustrated with reference to FIG. 4A and FIG. 4B below.

Figure 4A:
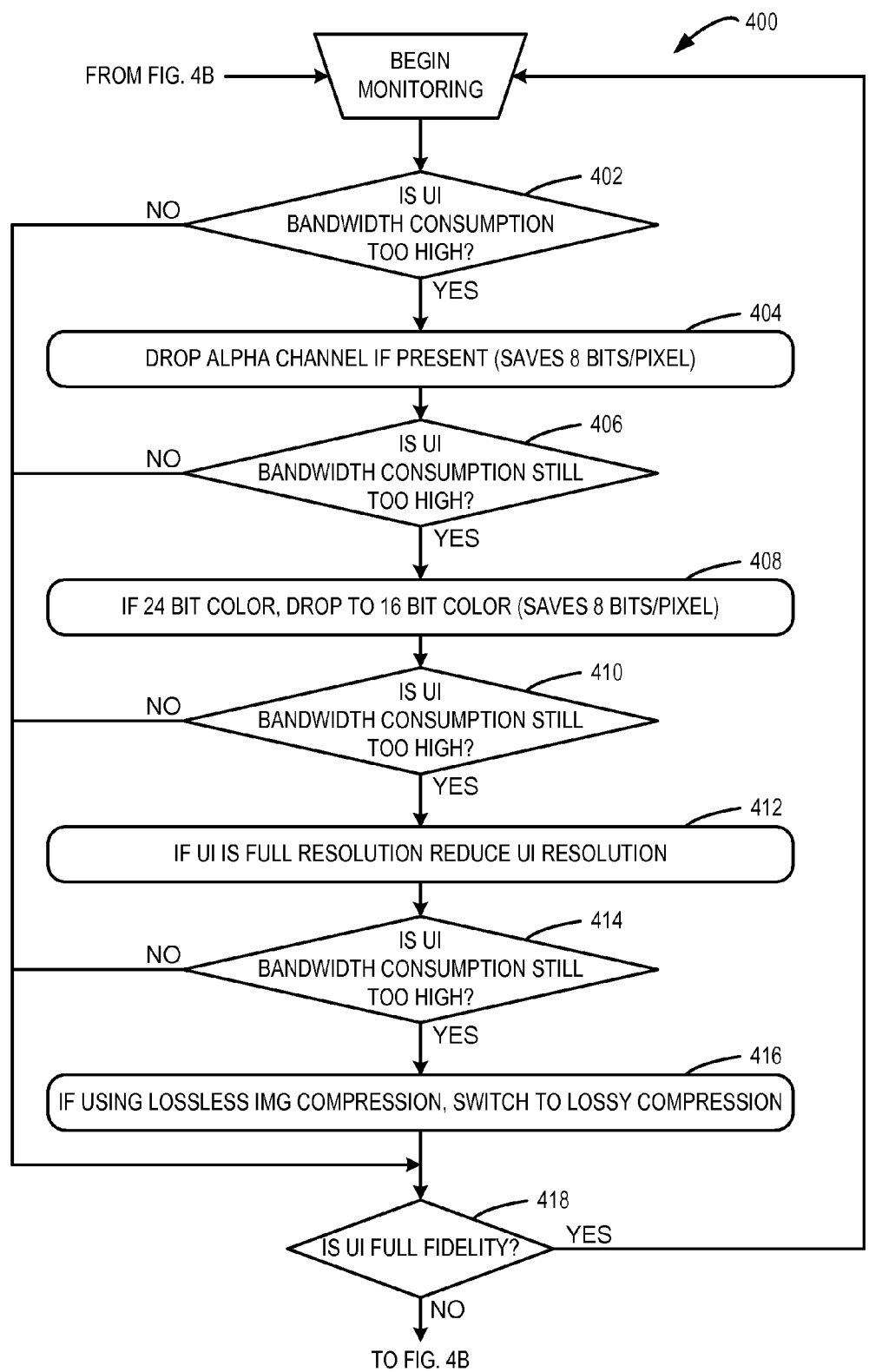
FIG. 4A shows a process flow of an embodiment of a method for scaling a user interface.

FIG. 4A shows a process flow of an embodiment of a detailed method 400 for scaling a user interface. After embodiment method 400 begins monitoring performance at a networked device, it queries if UI bandwidth consumption is too high in block 402. If the answer to the query is no, method 400 progresses to decision block 418 and queries if the UI is in full fidelity. If the result of the query in block 418 is no, method 400 progresses to FIG. 4B below. If the result of the query in block 418 is yes, method 400 continues monitoring performance. If the UI bandwidth was determined to be too high in block 402, the alpha channel is dropped if it is present in block 404.

After block 404, method 400 determines if UI bandwidth consumption is still too high in block 406. If the answer is no, it progresses in similar fashion to if the answer was no in block 402. If the answer is yes to the query in block 406, if the color depth is set at 24-bits, the color depth is dropped to 16 bit color depth, saving 8 bits/pixel. Then, in block 410, UI bandwidth consumption is monitored again, and if too high, method 400 determines if the UI is at full resolution, and if so, reduces the UI resolution in block 412. After again determining if the UI bandwidth consumption is too high, in block 416 the method may determine if lossless image compression is being used, and if so, switch to a lossy compression, and then proceed to block 418 and determine if the UI is at full fidelity. In the depicted embodiment, if the UI is not at full fidelity, method 400 moves to FIG. 4B. In alternate embodiments, after block 416, method 400 may undergo another UI bandwidth consumption check similar to block 414. If consumption is still too high after block 416, that embodiment method may loop to begin monitoring at the top of FIG. 4A, or to another block in FIG. 4A such as blocks 404, 406, etc., rather than continuing to FIG. 4B.

Figure 4B:
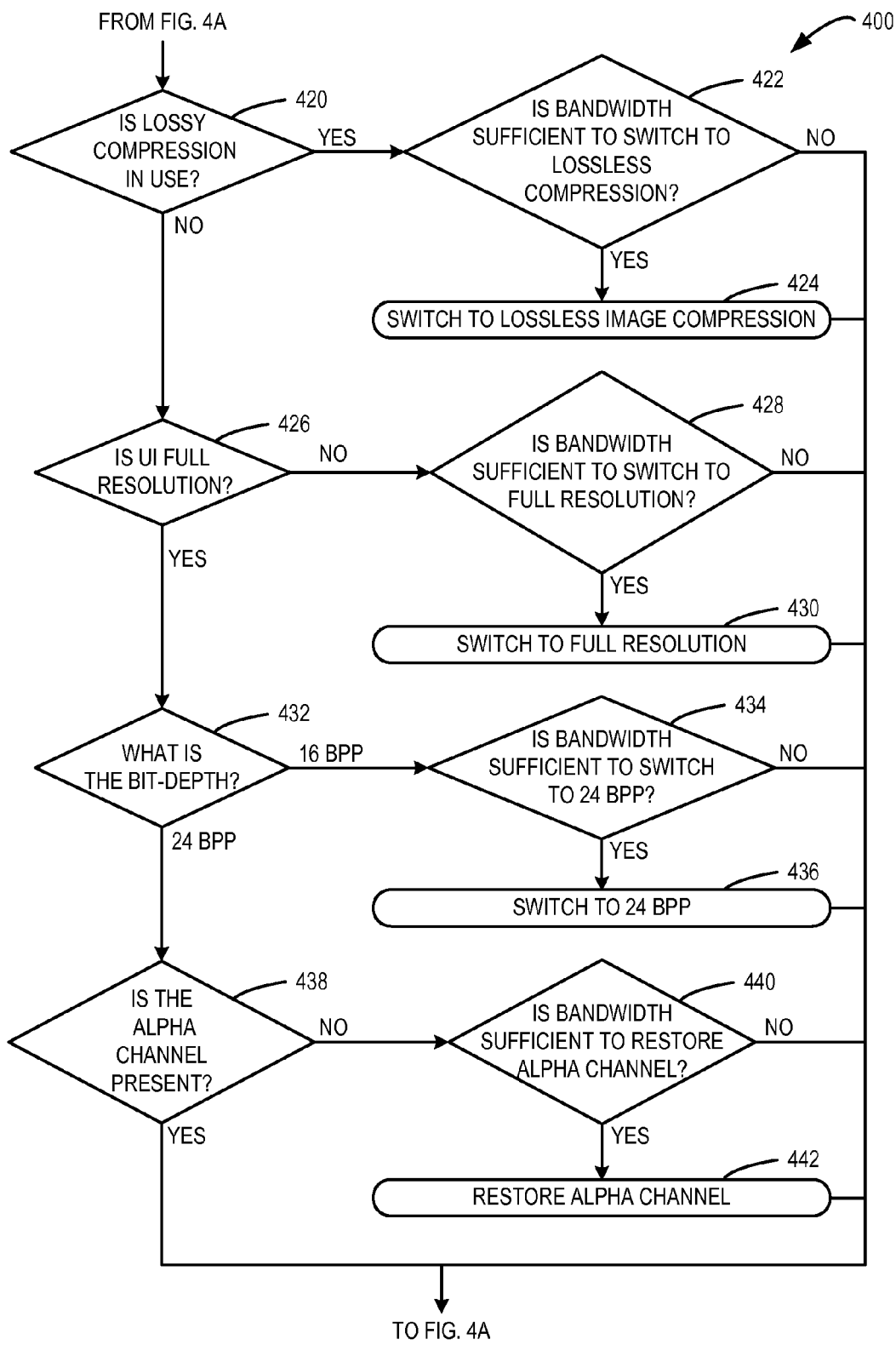
FIG. 4B shows a continuation of the process flow of FIG. 4A.

FIG. 4B shows additional process flow of the embodiment of the method in FIG. 4A. In block 420, method 400 queries if lossy compression is in use, and if so, determines if bandwidth is sufficient to switch to lossless compression in block 422. If not, then method 400 continues monitoring as illustrated in FIG. 4A. If bandwidth is sufficient to switch to lossless compression, method 400 does so in block 424 and continues monitoring as illustrated in FIG. 4A.

It will be further appreciated that the specific transrating processes and the order of the processes set forth in FIGS. 4A and 4B is merely exemplary, and that the steps may occur in any other suitable order. For example, block 430, 436, or 442 may be able to be utilized even if the result of block 422 is that bandwidth is not sufficient to switch to lossless compression. Further, while FIG. 4A shows several specific examples of processes for transrating the user interface signal, it will be appreciated that a specific transrating algorithm may utilize only a subset of the transrating processes, and/or may utilize other transrating processes not shown in FIGS. 4A and 4B.

If the result of the query in block 420 was that lossy compression is not in use, in block 426 the method determines if the UI is being presented at full resolution. If not, then method 400 determines if bandwidth is sufficient to change to full resolution in block 428, and the UI may be switched to full resolution in block 430 if so and method 400 then proceeds to the top of FIG. 4A. In other embodiments, the UI resolution may be increased without being switched to full resolution. In some embodiments, UI resolution may be increased multiple times before reaching full resolution. If the UI is already being presented at full resolution, the method queries what the bit depth is in block 432, and if it is 16 bits/pixel, determines if bandwidth is sufficient to switch back to 24 bits/pixel in block 434, and changes to 24 bits/pixel if so and continues monitoring at the top of FIG. 4A. If the bit depth is already 24 bits/pixel at block 432, then method 400 determines if the alpha channel is present in block 438, and if not determines if there is sufficient bandwidth to support the alpha channel in block 440 and then restores the alpha channel in block 442, if so. Then method 400 proceeds to the top of FIG. 4A and continues to monitor performance. It will be appreciated that the processes shown in method 400 may be performed in any suitable order, including but not limited to that shown in FIG. 4, and that one or more of the processes shown in FIG. 4 may be omitted in some embodiments.

While described herein in the context of a home streaming media environment, it will be appreciated that the concepts disclosed herein may be used in any suitable streaming media environment, including but not limited to other client-server-based use environments and peer-to-peer-based use environments. Furthermore, while the media server and media receiver are shown herein as being located on different devices, it will be understood that these components may comprise separate components, modules, programs or other entities running on a single device.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of scaling a user interface, the method comprising:
   streaming media content over a first channel of a network to a networked device;
   sending the user interface over a second channel of the network to the networked device, the first channel of the network being different from the second channel of the network, the user interface and media content being sent over the first channel and the second channel simultaneously;
   detecting a performance limitation of at least one of the network and the networked device; and
   in response to detecting the performance limitation:
   determining if a user interface state is active or inactive;
   if the user interface state is active, then transrating the media content while maintaining current user interface parameters; and
   if the user interface state is inactive, then scaling a parameter of the user interface while maintaining a current media bit rate.

2. The method of claim 1, wherein scaling a parameter includes adjusting at least one of a color bit depth, an alpha channel, graphic resolution, an encoding scheme, and the level or fidelity of an animation displayed in the user interface.

3. The method of claim 1, wherein the performance limitation includes at least one of a network latency, a network throughput limitation, and a client bandwidth utilization limitation.

4. The method of claim 1, wherein scaling a parameter involves adjusting the parameter during encoding of user interface data.

5. The method of claim 1, wherein scaling a parameter involves adjusting the parameter by transrating user interface data that has been encoded.

6. The method of claim 1, further comprising dynamically scaling a parameter of the user interface in response to the detected performance limitation or end of said limitation as network or device performance changes.

7. The method of claim 1, further comprising:
   receiving detailed profiling data of performance limitations in the network or in the device; and
   adjusting multiple parameters of the user interface in response to the detailed profiling data.

8. A system comprising:
   a networked device including memory, a processor, and instructions executable by the processor to:
   send to a display device via a first channel of a network a user interface;
   send to the display device via a second channel of the network media for compositing with the user interface at the display device, wherein the first channel is different from the second channel and wherein the user interface and the media are sent simultaneously;
   determine if a user interface state is active or inactive;
   determine a performance limitation of at least one of the network and the networked device;

if the user interface state is active, then transrate the media content while maintaining current user interface parameters; and if the user interface state is inactive, then adjust a parameter of the user interface while maintaining a current media bit rate.

9. The system of claim 8, wherein the parameter includes at least one of a color bit depth, an alpha channel, graphic resolution, an encoding scheme, and a level or fidelity of an animation displayed in the user interface.

10. The system of claim 8, wherein the performance limitation includes at least one of a network latency, a network throughput limitation, and a client bandwidth utilization limitation.

11. The system of claim 8, wherein the parameter of the user interface is adjusted during encoding of user interface data.

12. The system of claim 8, wherein the parameter of the user interface is adjusted after user interface data has been encoded.

13. The system of claim 8, wherein the instructions are further executable to adjust a parameter of the user interface dynamically in response to detecting the performance limitation or end of said performance limitation as one or more of network performance and networked device performance changes.

14. The system of claim 8, wherein the instructions are further executable to receive detailed profiling data of performance limitations in the network or in the networked device and adjust multiple parameters of the user interface in response to the detailed profiling data.

15. A method of managing congestion at a networked device, the method comprising:

receiving media content from a first channel of a network;

receiving a user interface from a second channel of the network, the first channel of the network being different from the second channel of the network, wherein the media content and user interface are received from the channels simultaneously;

compositing the user interface and the media content for presentation at a display device;

detecting a performance limitation of the user interface caused by at least one of the network and the networked device;

determining if a user interface state is active or inactive;

if the user interface state is active, then transrating the media content while maintaining current user interface parameters; and if the user interface state is inactive, then adjusting a current user interface parameter while maintaining a current media bit rate.

16. The method of claim 15, further comprising:

determining if the user interface or the media content is a secondary experience;

generating secondary experience data; and transmitting the secondary experience data to a media server via the network.

17. The method of claim 15, further comprising:

generating performance limitation data; and transmitting the performance limitation data to a media server via the network.

\* \* \* \* \*